(12) United States Patent
Lin et al.

(10) Patent No.: US 10,161,392 B2
(45) Date of Patent: Dec. 25, 2018

(54) ELECTROMAGNETIC VIBRATORY PUMP

(71) Applicant: APEX MEDICAL CORP., New Taipei (TW)

(72) Inventors: Ming-Han Lin, New Taipei (TW);
Chiu-Yu Yeh, New Taipei (TW);
Wen-Hsien Lin, New Taipei (TW);
Chih-Tsan Chien, New Taipei (TW)

(73) Assignee: APEX MEDICAL CORP., New Taipei (TW)

( * ) Notice: Subject to any disclaimer, the term of this patent is extended or adjusted under 35 U.S.C. 154(b) by 307 days.

(21) Appl. No.: 15/288,829

(22) Filed: Oct. 7, 2016

(65) Prior Publication Data
US 2017/0101984 A1 Apr. 13, 2017

(30) Foreign Application Priority Data
Oct. 8, 2015 (TW) .............................. 104133319 A

(51) Int. Cl.
*H02K 33/12* (2006.01)
*F04B 35/04* (2006.01)
*F04B 45/027* (2006.01)
*H02K 33/16* (2006.01)
*F04B 39/12* (2006.01)
(Continued)

(52) U.S. Cl.
CPC ............ *F04B 35/04* (2013.01); *F04B 35/045* (2013.01); *F04B 39/12* (2013.01); *F04B 45/027* (2013.01); *H01F 7/081* (2013.01); *H01F 7/10* (2013.01); *H01F 7/14* (2013.01); *H02K 33/16* (2013.01); *H02K 1/141* (2013.01); *H02K 2213/03* (2013.01)

(58) Field of Classification Search
CPC ........ H02K 33/12; F04B 45/027; F04B 39/12
USPC ...................... 310/12.01, 12.26, 36; 335/232
See application file for complete search history.

(56) References Cited

U.S. PATENT DOCUMENTS 3,500,080 A * 3/1970 Bey ........................ H02K 33/06
310/29
3,838,944 A * 10/1974 Kolfertz .............. F04B 11/0008
417/312

(Continued)

FOREIGN PATENT DOCUMENTS

CN 1272976 A 11/2000
JP H0663879 U 9/1994

*Primary Examiner* — Patrick Hamo
(74) *Attorney, Agent, or Firm* — Muncy, Geissler, Olds & Lowe, P.C.

(57) ABSTRACT

Disclosed is an electromagnetic vibratory pump, comprising a first C-shaped winding and a first magnet. The first C-shaped winding comprises a first coil and a first electromagnetizable member. The first coil covers the first electromagnetizable member, which comprises a first main body, a first leg and a second leg. The legs are connected to the first main body, and the distance between the legs is reduced from a first width to a second width from the first main body. The first magnet swings in a circular tangential direction. A point of tangency of the circular tangential direction is configured apart from the first leg and the second leg respectively by a first minimum distance. The first minimum distance is less than a half of the second width. The first magnet is driven by the first magnetic line of force to move in the first circular tangential direction, and the first magnet is driven by the second magnetic line of force to move in the second circular tangential direction.

20 Claims, 11 Drawing Sheets

(51) Int. Cl.
*H01F 7/08* (2006.01)
*H01F 7/10* (2006.01)
*H01F 7/14* (2006.01)
H02K 1/14 (2006.01)

(56) References Cited

U.S. PATENT DOCUMENTS

| | | | | |
|---|---|---|---|---|
| 5,013,223 | A | * | 5/1991 | Takahashi ............. F04B 17/042 310/12.04 |
| 5,066,204 | A | * | 11/1991 | Point ....................... F04B 43/04 310/36 |
| 5,730,587 | A | * | 3/1998 | Snyder .................... F04B 17/04 417/413.1 |
| 5,982,259 | A | * | 11/1999 | Godfrey ............... H01H 50/323 335/177 |
| 6,249,198 | B1 | * | 6/2001 | Clark ...................... F04B 43/04 310/36 |

\* cited by examiner

ELECTROMAGNETIC VIBRATORY PUMP

CROSS-REFERENCE TO RELATED APPLICATION

This application claims priority of Taiwan Patent Application No. 104133319, filed on Oct. 8, 2015, the entirety of which is incorporated by reference herein.

BACKGROUND OF THE INVENTION

1. Field of the Invention

The present disclosure relates to an electromagnetically-driven apparatus and more particularly to an electromagnetic vibratory pump including a winding structure configured to drive one or more magnets.

2. Description of Related Art

Conventionally, the attraction and repulsion of a permanent magnet induced by electromagnetism is used to convert electrical energy into mechanical energy. One example operated in accordance with this principle is electric motors, also known as motors or pumps.

In an electric motor, moving charges in the coil, i.e. electrical current, create a magnetic field in the form of magnetic lines of force, which accordingly form an N-pole and an S-pole on the coil. When a permanent magnet exists in the magnetic field defined by the magnetic lines of force, the permanent magnet is moved due to magnetic repulsion and attraction until the magnetic lines of force disappear.

Generally, two different modes of movement are known for the permanent magnet. In the first mode, the permanent magnet rotates continuously in a closed coil. In the second mode, the permanent magnet swings back and forth in response to the alternating magnetic poles.

There are several drawbacks in the second mode that result in poor swinging efficiency. For example, in the swing trajectory of the permanent magnet, the distance between the permanent magnet and the coil is not always identical, so that the permanent magnet cannot consistently receive the same magnetic attraction intensity. Therefore, during swinging, the amplitude of swing of the permanent magnet will vary. In addition, in a device with multiple permanent magnets, collision of permanent magnets happens due to the inconsistent amplitudes of swing, and the service life of permanent magnets is therefore shortened.

Accordingly, there is a need to provide an electromagnetic vibratory pump to address the drawbacks in the conventional arts.

SUMMARY OF THE INVENTION

The first object of the present disclosure is to provide an electromagnetic vibratory pump, comprising a first C-shaped winding and a first magnet. By modifying at least one of the magnet width and end section shape and end section width of the first electromagnetizable member of the first C-shaped winding, the intensity of magnetic attraction or repulsion acting on the first electromagnetizable member is changed, thereby increasing or decreasing the amplitude of swing of the first magnet.

The second object of the present disclosure is to provide an electromagnetic vibratory pump, in which the shape of an end face, e.g. curved surface or planar surface, of the first electromagnetizable member is modified to create uniform magnetic attraction on the first magnet.

The third object of the present disclosure is to provide an electromagnetic vibratory pump, further comprising a second C-shaped winding and a second magnet. By combining the first C-shaped winding and the second C-shaped winding, an E-shaped winding is formed to enable the first magnet and the second magnet to swing at the same time.

The fourth object of the present disclosure is to provide an electromagnetic vibratory pump, wherein a notch is formed at the junction of the first C-shaped winding and the second C-shaped winding to avoid collision of the first magnet and the second magnet during swinging.

The fifth object of the present disclosure is to provide an electromagnetic vibratory pump, further comprising a first gas output unit and a second gas output unit, which may be respectively connected with the first magnet and the second magnet such that the purpose of gas output is achieved by the swinging movement of the first magnet and the second magnet.

The sixth object of the present disclosure is to provide an electromagnetic vibratory pump, wherein the E-shaped winding is formed integrally as one piece or configured as a combination of the first C-shaped winding and the second C-shaped winding.

To achieve the above and other objects, the present disclosure provides an electromagnetic vibratory pump, which comprises a first C-shaped winding and a first magnet. The first C-shaped winding comprises a first coil and a first electromagnetizable member. The first coil is covered on the first electromagnetizable member. The first electromagnetizable member comprises a first main body, a first leg and a second leg. The first leg and the second leg individually include a first end, a second end and a magnetizable portion arranged between the first end and the second end. As used herein, the first end and the second end refer to the aforesaid end sections. The first end of the first leg and the first end of the second leg are respectively connected with the first main body, wherein the magnetizable portion of the first leg and the magnetizable portion of the second leg define a first width therebetween, the second end of the first leg and the second end of the second leg define a second width therebetween, and the second width is less than the first width. The first magnet is arranged in proximity to the second end of the first leg and the second end of the second leg, the first magnet swinging in a circular tangential direction, wherein a first minimum distance is defined between a point of tangency of the circular tangential direction and each second end, and the first minimum distance is less than a half of the second width; wherein the first C-shaped winding, in the presence of electric current, forms a first magnetic line of force and a second magnetic line of force which are of different directions, the first magnet being driven by the first magnetic line of force to move in a first circular tangential direction and the first magnet being driven by the second magnetic line of force to move in a second circular tangential direction.

To achieve the above and other objects, the present disclosure provides an electromagnetic vibratory pump, which comprises an E-shaped winding, a third magnet and a fourth magnet. The E-shaped winding includes a coil and an electromagnetizable member, the coil covering the electromagnetizable member, the electromagnetizable member including a main body, a central leg, a first side leg and a second side leg, the central leg being arranged between the first side leg and the second side leg; the central leg, the first side leg and the second side leg individually include a first end, a second end and a magnetizable portion between the first end and the second end, the first end being connected with the main body, wherein the magnetizable portion of the central leg and the magnetizable portion of the first side leg define a fifth width, the second end of the central leg and the second end of the first side leg define a sixth width, the magnetizable portion of the central leg and the magnetizable portion of the second side leg define a seventh width, and the second end of the central leg and the second end of the second side leg define an eighth width, wherein the sixth width is less than the fifth width, and the eighth width is less than the seventh width. The third magnet is arranged in proximity to the second end of the first side leg and the second end of the central leg, the third magnet swinging in a circular tangential direction, wherein a third minimum distance is defined between a point of tangency of the circular tangential direction and each second end, and the third minimum distance is less than a half of the seventh width. The fourth magnet is arranged in proximity to the second end of the second side leg and the second end of the central leg, the fourth magnet swinging in a circular tangential direction, wherein a fourth minimum distance is defined between a point of tangency of the circular tangential direction and each second end, and the fourth minimum distance is less than a half of the eighth width. The E-shaped winding, in the presence of electric current, forms a fifth magnetic line of force and a sixth magnetic line of force which are of different directions, the third magnet and the fourth magnet being driven by the fifth magnetic line of force to move in a third circular tangential direction and the third magnet and the fourth magnet being driven by the sixth magnetic line of force to move in a fourth circular tangential direction.

The electromagnetic vibratory pump of the present disclosure, by changing the second width between multiple second ends of the first electromagnetizable member (i.e. making the second width be less than the first width), modifying the shape of the second end, or changing the shape of the end face of the second end, may adjust the intensity of magnetic attraction generated by the first electromagnetizable member, thereby overcoming the drawbacks of the conventional arts.

The electromagnetic vibratory pump winding can be configured as a C-shaped winding, multiple C-shaped windings, an E-shaped winding or multiple E-shaped windings.

The electromagnetic vibratory pump, configured as the C-shaped winding(s) or the E-shaped winding(s), may further include a notch to reduce or eliminate the magnetic attraction of the winding(s) on multiple magnets to avoid collision of the magnets.

BRIEF DESCRIPTION OF THE DRAWINGS

The accompanying drawings are included to provide a further understanding of the invention, and are incorporated in and constitute a part of this specification. The drawings illustrate embodiments of the disclosure and, together with the description, serve to explain the principles of the disclosure.

DESCRIPTION OF THE EMBODIMENTS

Embodiments are illustrated in the accompanying figures to improve understanding of purposes, features and effects as presented in this disclosure.

Figure 1:
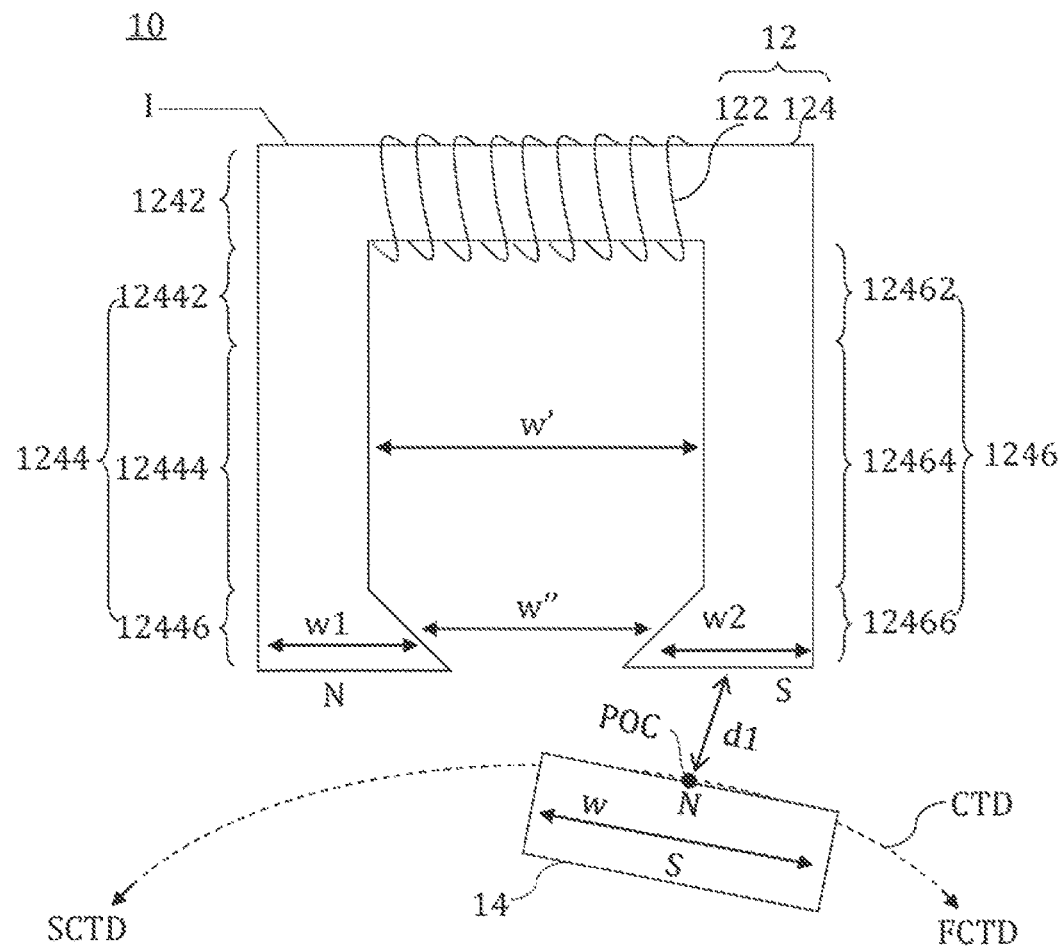
FIG. 1 illustrates the structure of an electromagnetic vibratory pump of the first embodiment according to the present disclosure.

FIG. 1 illustrates the structure of an electromagnetic vibratory pump of the first embodiment according to the present disclosure, wherein the electromagnetic vibratory pump 10 comprises a first C-shaped winding 12 and a first magnet 14.

Figure 2:
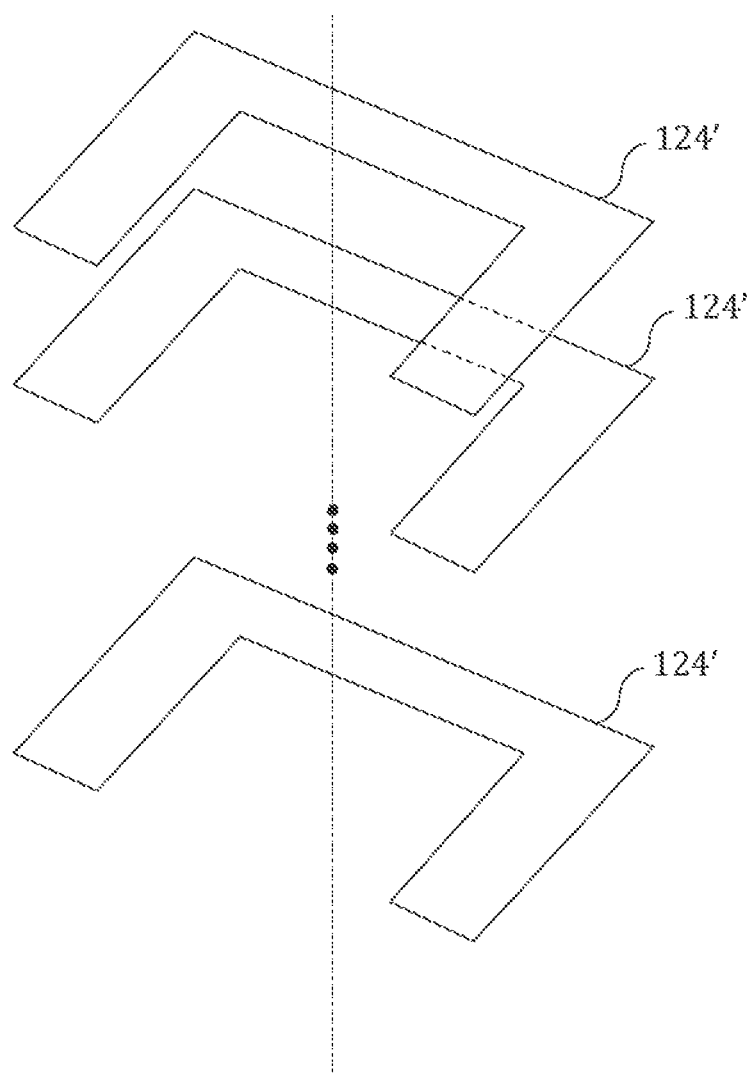
FIG. 2 illustrates an exploded view of the first C-shaped winding of FIG. 1.

The first C-shaped winding 12 comprises a first coil 122 and a first electromagnetizable member 124. In one embodiment, the first coil 122 is covered on the first electromagnetizable member 124 with multiple loops (a.k.a. turns). As illustrated in FIG. 2, the first electromagnetizable member 124 may be configured as multiple sheets 124' stacked on each other, and each sheet 124' may be configured as a C-shape. In other embodiments, the first electromagnetizable member 124, instead of being configured as the sheets 124', may also be configured as a block integrally formed as one piece. In FIG. 1, the first C-shaped winding 12, in response to electric current I, forms a first magnetic line of force (not shown) and a second magnetic line of force (not shown), wherein the first magnetic line of force and the second magnetic line of force are of different directions. In this embodiment, the first C-shaped winding 12, in the presence of the electric current I, forms an N-pole and an S-pole on the first electromagnetizable member 124. It should be noted that, as the electric current I is an alternating current, the voltage of the electric current I switches alternatingly between positive voltage and negative voltage, such that the polarity of the first electromagnetizable member 124 changes correspondingly in response thereto. For the sake of brevity, temporary polarity is used as the example for the illustration purpose of this embodiment.

The first electromagnetizable member 124 comprises a first main body 1242, a first leg 1244 and a second leg 1246. The first leg 1244 comprises a first end 12442, a magnetizable portion 12444 and a second end 12446, wherein the magnetizable portion 12444 is arranged between the first end 12442 and the second end 12446. The first end 12442 is connected with the first main body 1242. The first end 12442 has a planar end face. The end face width of the second end 12446 is designated as w1. The second leg 1246, which is symmetrical to the first leg 1244, also comprises a first end 12462, a magnetizable portion 12464 and a second end 12466. The magnetizable portion 12464 is arranged between the first end 12462 and the second end 12466. The first end 12462 is connected with the first main body 1242. The first end 12462 has a planar end face, and the end face width of the second end 12466 is designated as w2.

The magnetizable portion 12444 of the first leg 1244 and the magnetizable portion 12464 of the second leg 1246 are apart from each other by a first width w', and the second end 12446 of the first leg 1244 and the second end 12466 of the second leg 1246 are apart from each other by a second width w'', wherein the second width w'' is less than the first width w'.

In this embodiment, the second end 12446 of the first leg 1244 is protruded and extended toward the second end 12466 of the second leg 1246, and the second end 12466 of the second leg 1246 is protruded and extended toward the second end 12446 of the first leg 1244. By changing the shape of the second ends 12446, 12466, the magnetic attraction of the first C-shaped winding 12 can be adjusted. Herein, the second end 12446 of the first leg 1244 and the second end 12466 of the second leg 1246 are exemplified as a trapezoid, but in other embodiments they may also be independently configured as other shapes such as a parallelogram.

In this embodiment, in addition to changing the shape of the second ends 12446, 12466, widths w1, w2 of the second ends 12446, 12466 may also be modified to alter the magnetic attraction intensity. In other words, various approaches can be envisioned, such as changing the shape or adjusting the width, and all these embodiments belong to the scope of the present disclosure as long as the second width w'' is less than the first width w', as illustrated in FIG. 3(a) to FIG. 3(h).

Figure 3A:
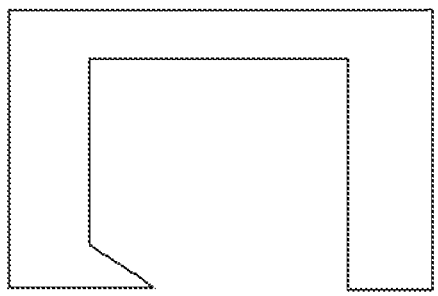
FIG. 3(*a*) to FIG. 3(*h*) illustrate several different structures of the second end of the first leg and the second end of the second leg of the first embodiment according to the present disclosure.
Figure 3B:
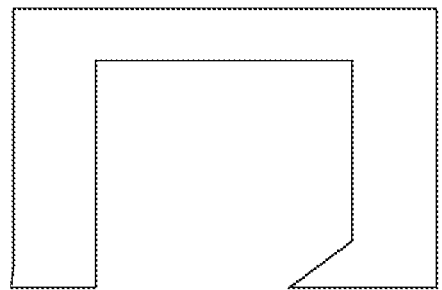

In FIGS. 3(a) and 3(b), only the width of the second end 12446 of the first leg 1244 or the width of the second end 12466 of the second leg 1246 is changed. In other words, FIG. 3(a) illustrates that the second end 12446 of the first leg 1244 is protruded and extended toward the second end 12466 of the second leg 1246, and the width of the second end 12466 of the second leg 1246 is equal to the width of its magnetizable portion 12464. In FIG. 3(b), the second end 12466 of the second leg 1246 is protruded and extended toward the second end 12446 of the first leg 1244, and the width of the second end 12446 of the first leg 1244 is equal to the width of its magnetizable portion 12444.

Figure 3C:
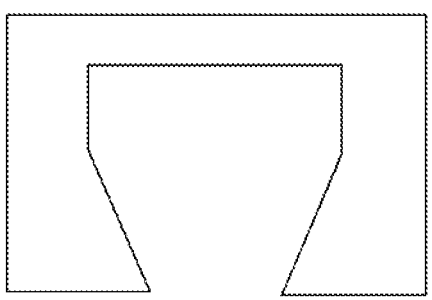

In FIG. 3(c), the first width between the magnetizable portions 12444, 12464 is not constant; the magnetizable portion 12444 of the first leg 1244 is extended and protruded toward the magnetizable portion 12464 of the second leg 1246, and the magnetizable portion 12464 of the second leg 1246 is extended and protruded toward the magnetizable portion 12444 of the first leg 1244.

Figure 3D:
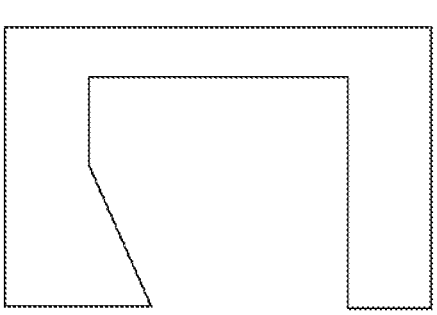
Figure 3E:
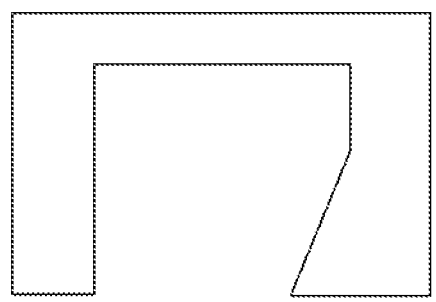

In FIG. 3(d), the magnetizable portion 12444 of the first leg 1244 is extended and protruded toward the magnetizable portion 12464 of the second leg 1246, and the width of the second end 12466 of the second leg 1246 is equal to the width of the magnetizable portion 12464. In FIG. 3(e), the magnetizable portion 12464 of the second leg 1246 is extended and protruded toward the magnetizable portion 12444 of the first leg 1244, and the width of the second end 12446 of the first leg 1244 is equal to the width of the magnetizable portion 12444.

Figure 3F:
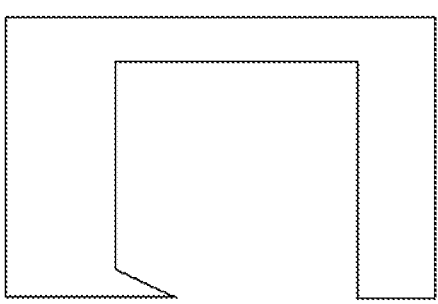
Figure 3G:
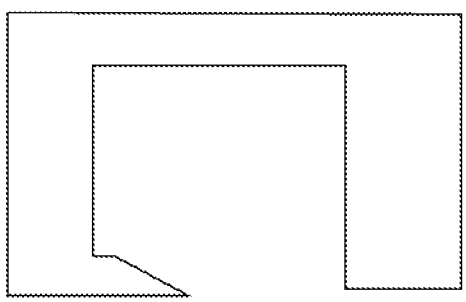

In FIG. 3(f), the width of the second end 12446 of the first leg 1244 is greater than the width of the second end 12466 of the second leg 1246. In FIG. 3(g), the width of the second end 12466 of the second leg 1246 is greater than the width of the second end 12446 of the first leg 1244.

Figure 3H:
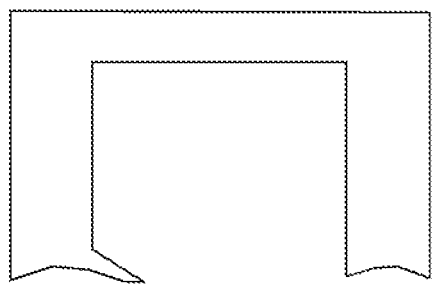

In FIG. 3(h), in contrast to FIG. 3(a), the end face of the second ends 12446, 12466 is configured as a curved surface, not a planar surface.

Refer back to FIG. 1, the first magnet 14 and the first C-shaped winding 12 are correlated to each other in terms of width, as follows:

$$0.5 \times w < (w1 + w'') < 1.5 \times w$$

or $$0.5 \times w < (w'' + w2) < 1.5 \times w$$

wherein w represents the width of the first magnet 14, w1 represents the end face width of the second end 12446 of the first leg 1244, w'' represents the second width, and w2 represents the end face width of the second end 12466 of the second leg 1246.

The first magnet 14 is arranged in proximity to the second ends 12446, 12466. In this embodiment, the terminal of the first magnet 14 close to the second ends 12446, 12466 is the N-pole and the other terminal is the S-pole. When the second end 12466 is the S-pole, the first magnet 14 is attracted by the opposite pole and moves in the clockwise direction; on the contrary, when the polarity of the second end 12466 changes to the N-pole from the S-pole, the first magnet 14 is repulsed by the same pole and therefore moves in the counterclockwise direction. In this embodiment, the first magnet 14 moves in a circular tangential direction CTD. A point of tangency POC of the circular tangential direction CTD and each of the second ends 12446, 12466 are spaced apart from each other by a first minimum distance d1, which is less than a half of the second width w''.

It should be noted that the width w of the first magnet 14 is the distance of the longest edge of the first magnet 14. However, the width w refers not only to the width of the longest edge of the first magnet 14, but to the length of tangential direction of the first magnet 14 in the circular tangential direction CTD.

The first magnet 14 is driven by the first magnetic line of force to move in the first circular tangential direction FCTD, and the first magnet 14 is driven by the second magnetic line of force to move in the second circular tangential direction SCTD. In this embodiment, the first circular tangential direction FCTD is the clockwise direction, and the second circular tangential direction SCTD is the counterclockwise direction. In other embodiments, the first circular tangential direction FCTD and the second circular tangential direction SCTD are not particularly limited thereto.

Figure 4:
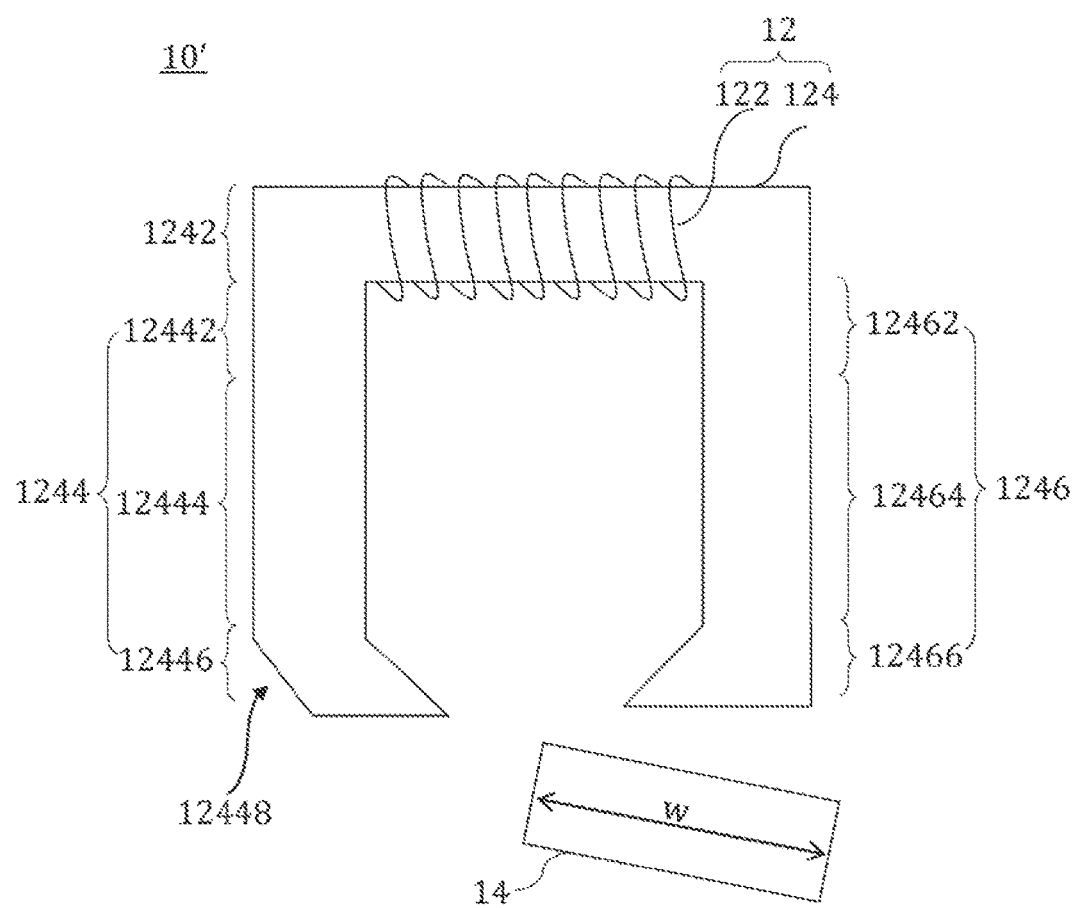
FIG. 4 illustrates the structure of an electromagnetic vibratory pump of the second embodiment according to the present disclosure.

FIG. 4 illustrates the structure of an electromagnetic vibratory pump of the second embodiment according to the present disclosure. In this embodiment, the electromagnetic vibratory pump 10' also comprises, similar to the first embodiment, the first C-shaped winding 12 and the first magnet 14, but the second end 12446 of the first leg 1244 further forms a notch 12448.

The notch 12448 has a structure or shape in association to or in correspondence to the distribution of at least one of the first magnetic line of force and the second magnetic line of force. When the first magnet 14 moves close to the notch 12448, the notch 12448 may reduce or eliminate the magnetic attraction of the second end 12446 of the first leg 1244 acting on the first magnet 14, thereby adjusting the amplitude of swing of the first magnet 14 so as to avoid undue swinging of the first magnet 14. In other words, the notch 12448 is configured for adjusting the amplitude of swing of the first magnet 14.

Figure 5:
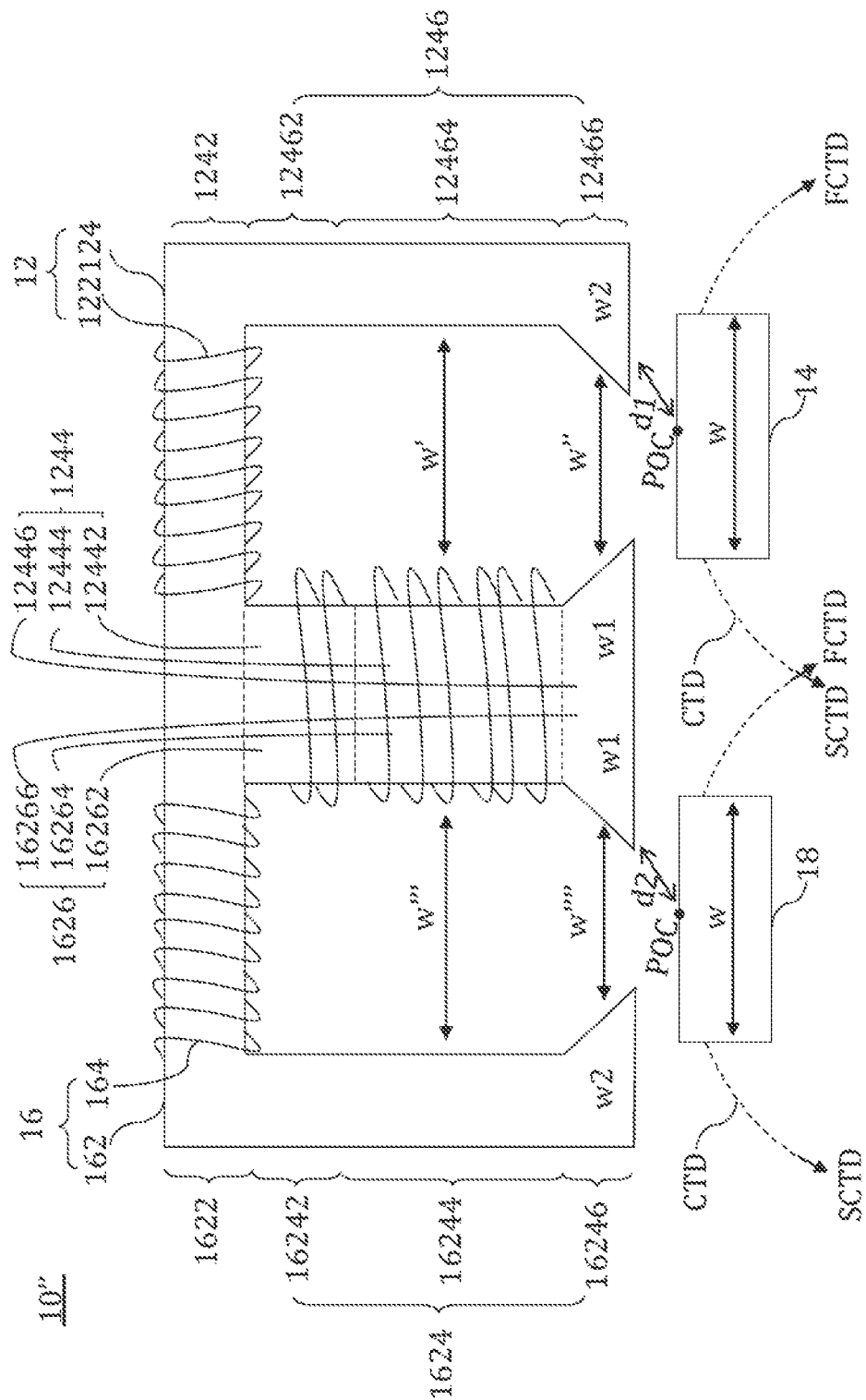
FIG. 5 illustrates the structure of an electromagnetic vibratory pump of the third embodiment according to the present disclosure.

FIG. 5 illustrates the structure of an electromagnetic vibratory pump of the third embodiment according to the present disclosure. In this embodiment, the electromagnetic vibratory pump 10" also comprises the first C-shaped winding 12 and the first magnet 14 of the first embodiment and further comprises a second C-shaped winding 16 and a second magnet 18. The first C-shaped winding 12 is connected with the second C-shaped winding 16 to form an E-shaped winding, wherein the second C-shaped winding 16 and the second magnet 18 serve the same functions as the first C-shaped winding 12 and the first magnet 14 respectively and therefore are not described in detail herein for brevity.

The second C-shaped winding 16 comprises a second electromagnetizable member 162 and a second coil 164. The second coil 164 covers the second electromagnetizable member 162. The second electromagnetizable member 162 comprises a second main body 1622, a third leg 1624 and a fourth leg 1626. The second main body 1622 is connected with the first main body 1242; the fourth leg 1626 is combined with the first leg 1244; the third leg 1624 comprises a first end 16242, a magnetizable portion 16244 and a second end 16246; the fourth leg 1626 comprises a first end 16262, a magnetizable portion 16264 and a second end 16266; the second C-shaped winding 16, in the presence of electric current I, forms a third magnetic line of force (not shown) and a fourth magnetic line of force (not shown), wherein the third magnetic line of force and the fourth magnetic line of force are of different directions.

The first end 16242 of the third leg 1624 and the first end 16262 of the fourth leg 1626 are connected with the second main body 1622, wherein the magnetizable portion 16244 of the third leg 1624 and the magnetizable portion 16264 of the fourth leg 1626 are spaced apart from each other by a third width w''', and the second end 16246 of the third leg 1624 and the second end 16266 of the fourth leg 1626 are spaced apart from each other by a fourth width w'''', wherein the fourth width w'''' is less than the third width w'''.

The second magnet 18 is arranged in proximity to the second end 16246 of the third leg 1624 and the second end 16266 of the fourth leg 1626. The second magnet 18 has a width w, and the second magnet 18 swings in a circular tangential direction CTD. The point of tangency POC of the circular tangential direction CTD and each second ends 16246, 16266 are apart from each other by a second minimum distance d2, wherein the second minimum distance d2 is less than a half of the fourth width w''''.

The second magnet 18 is driven by the third magnetic line of force to move in the first circular tangential direction FCTD, and the second magnet 18 is driven by the fourth magnetic line of force to move in the second circular tangential direction SCTD. In this embodiment, the first magnet 14 and the second magnet 18 move in different circular tangential directions.

The relationship between the second C-shaped winding 16 and the second magnet 18 in terms of width is similar to the above-described width formula of the first magnet 14 and the first C-shaped winding 12 in the first embodiment and therefore not described in detail herein for brevity.

Figure 6:
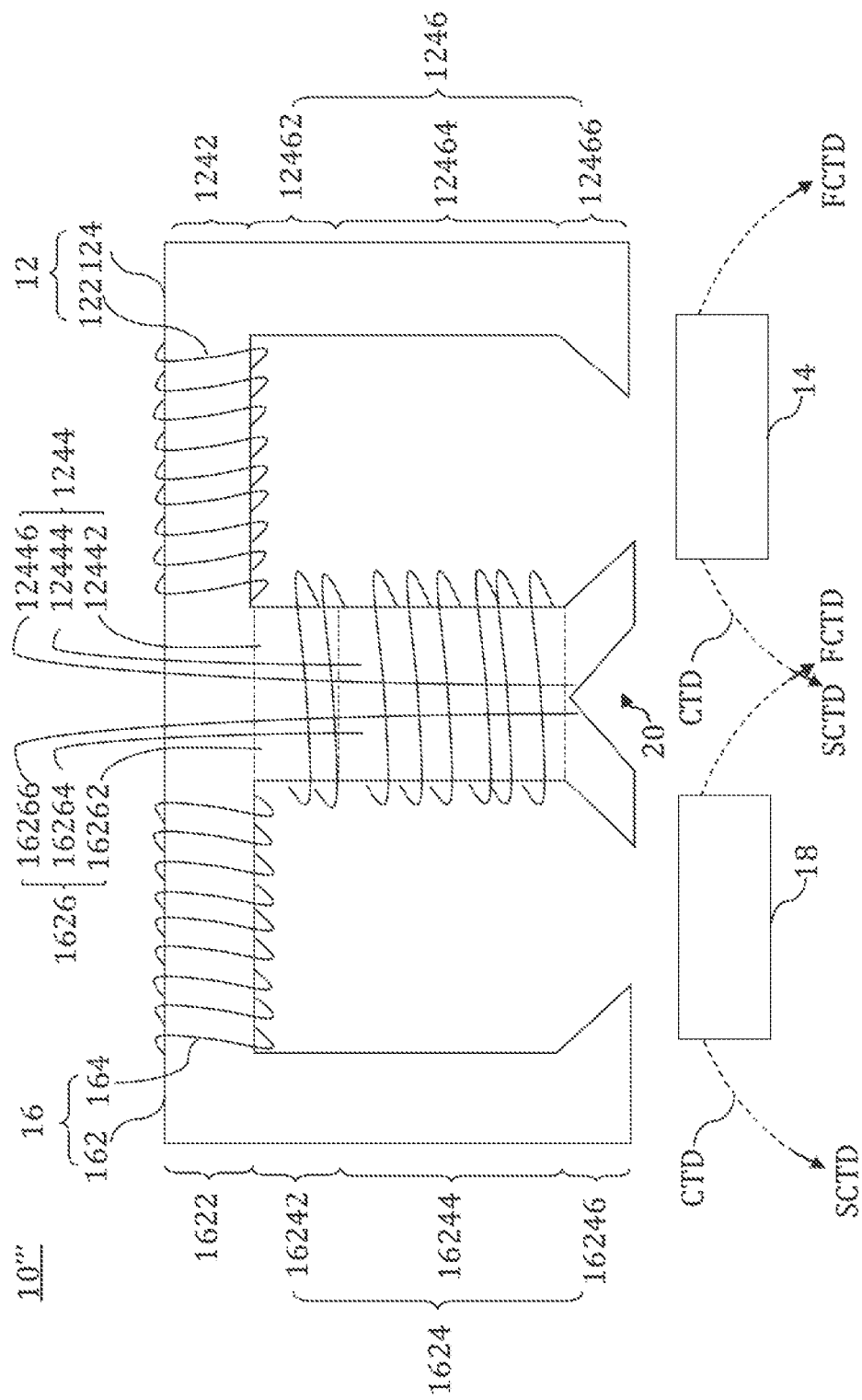
FIG. 6 illustrates the structure of an electromagnetic vibratory pump of the fourth embodiment according to the present disclosure.

FIG. 6 illustrates the structure of an electromagnetic vibratory pump of the fourth embodiment according to the present disclosure. In this embodiment, the electromagnetic vibratory pump 10''' comprises the first C-shaped winding 12 and the first magnet 14 of the first embodiment and the second C-shaped winding 16 and the second magnet 18 of the third embodiment. This embodiment is characterized in that the second end 16246 of the fourth leg 1624 and the second end 12446 of the first leg 1244 form a notch 20, wherein the notch 20 may be formed by at least two ways. In one example, the notch 20 is formed after the first leg 1244 and the fourth leg 1624 are connected; in another example, similar to the description of the notch 12448 in the second embodiment, a notch is formed in advance on the first leg 1244 and the fourth leg 1624, and the notch 20 is formed after the first leg 1244 and the fourth leg 1624 are connected.

The notch 20 has a shape or structure corresponding to and in association with the distribution of at least one of the first magnetic line of force, the second magnetic line of force, the third magnetic line of force and the fourth magnetic line of force. For example, the notch 20 is designed in such a way that it does not influence, interfere or damage the smoothness of at least one of the first magnetic line of force, the second magnetic line of force, the third magnetic line of force and the fourth magnetic line of force.

Figure 7:
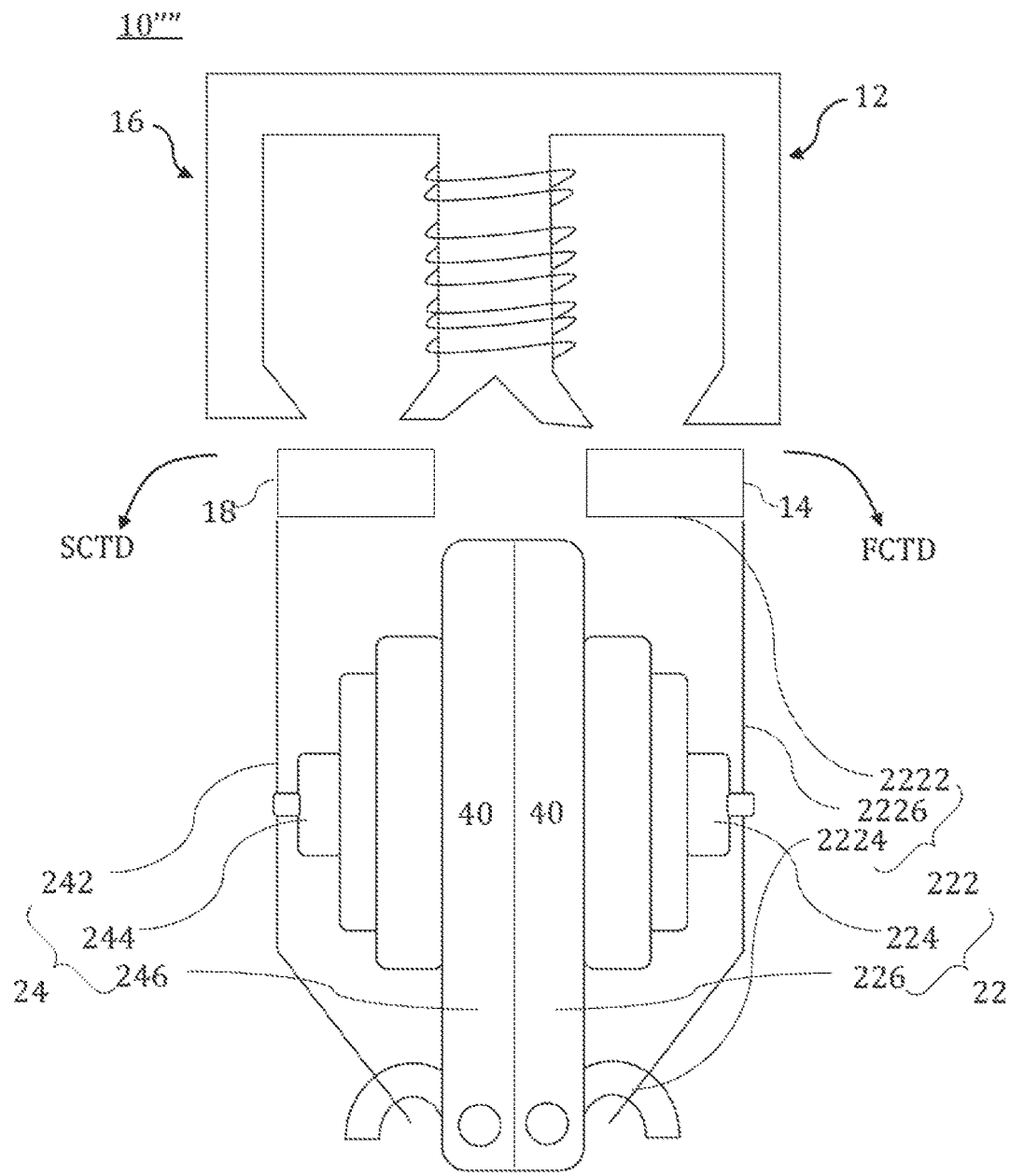
FIG. 7 illustrates the structure of an electromagnetic vibratory pump of the fifth embodiment according to the present disclosure.

FIG. 7 illustrates the structure of an electromagnetic vibratory pump of the fifth embodiment according to the present disclosure. In this embodiment, the electromagnetic vibratory pump 10'''' further comprises a first gas output unit 22 and a second gas output unit 24 in addition to the first C-shaped winding 12, the first magnet 14, the second C-shaped winding 16 and the second magnet 18 of the fourth embodiment.

The first gas output unit 22 is connected with the first magnet 14. When the first C-shaped winding 12 drives the first magnet 14 to swing back and forth in the first circular tangential direction FCTD and the second circular tangential direction SCTD, the first gas output unit 22 correspondingly outputs gas 40. In contrast, the second gas output unit 24 is connected with the second magnet 18 and driven by the second C-shaped winding 16, and the second gas output unit 24 is operated in a similar manner to the first gas output unit 22 ○

In this embodiment, the first gas output unit 22 comprises a vibration bar 222, a rubber cap 224 and a gas chamber 226. The vibration bar 222 comprises two terminals 2222, 2224 and a bar body 2226. The bar body 2226 is formed between the two terminals 2222, 2224, wherein one terminal of the vibration bar 222 is connected with the first magnet 14 and the other terminal 2224 of the vibration bar 222 is fixed at the gas chamber 226. The rubber cap 224 is arranged between the bar body 2226 and the gas chamber 226, wherein the rubber cap 224 is made of flexible material. The vibration bar 222 has one terminal 2222 magnetically attracted by the first magnet 14 to swing and drive the other terminal 2224 of the vibration bar 222. The rubber cap 224, driven by the other terminal 2224 of the vibration bar 222, generates a force to change the direction of stream of the gas 40 in the gas chamber 226, as described in detail by reference to FIGS. 8(a) to 8(c).

In FIG. 8(a), the other terminal 2224 of the vibration bar 222 does not impose any force F on the rubber cap 224, such that the gas 40 stays still in the gas chamber 226. In FIG. 8(b), the other terminal 2224 of the vibration bar 222 imposes the force F on the rubber cap 224, such that the rubber cap 224 moves toward the gas chamber 226. Since the space defined by the rubber cap 224 is compressed by the force F, the gas 40 in the gas chamber 226 is forced out therefrom. In FIG. 8(c), the other terminal 2224 of the vibration bar 222 imposes on the rubber cap 224 another force F' which is opposite to the force F, such that the rubber cap 224 is moved away from the gas chamber 226. Since the space defined by the rubber cap 224 is expanded by the force F', the gas chamber 226 receives extra air to increase the volume of the gas 40. Therefore, the repeated operations of FIGS. 8(a) to 8(c) enable the first gas output unit 22 to act like an air pump to output the gas 40.

Refer back to FIG. 7. The second gas output unit 24 is symmetrical to the first gas output unit 22, so that the second gas output unit 24 also comprises a vibration bar 242, a rubber cap 244 and a gas chamber 246. Since the second gas output unit 24 is operated in the same way as the first gas output unit 22, the operation process is not described in detail herein for brevity.

Figure 9:
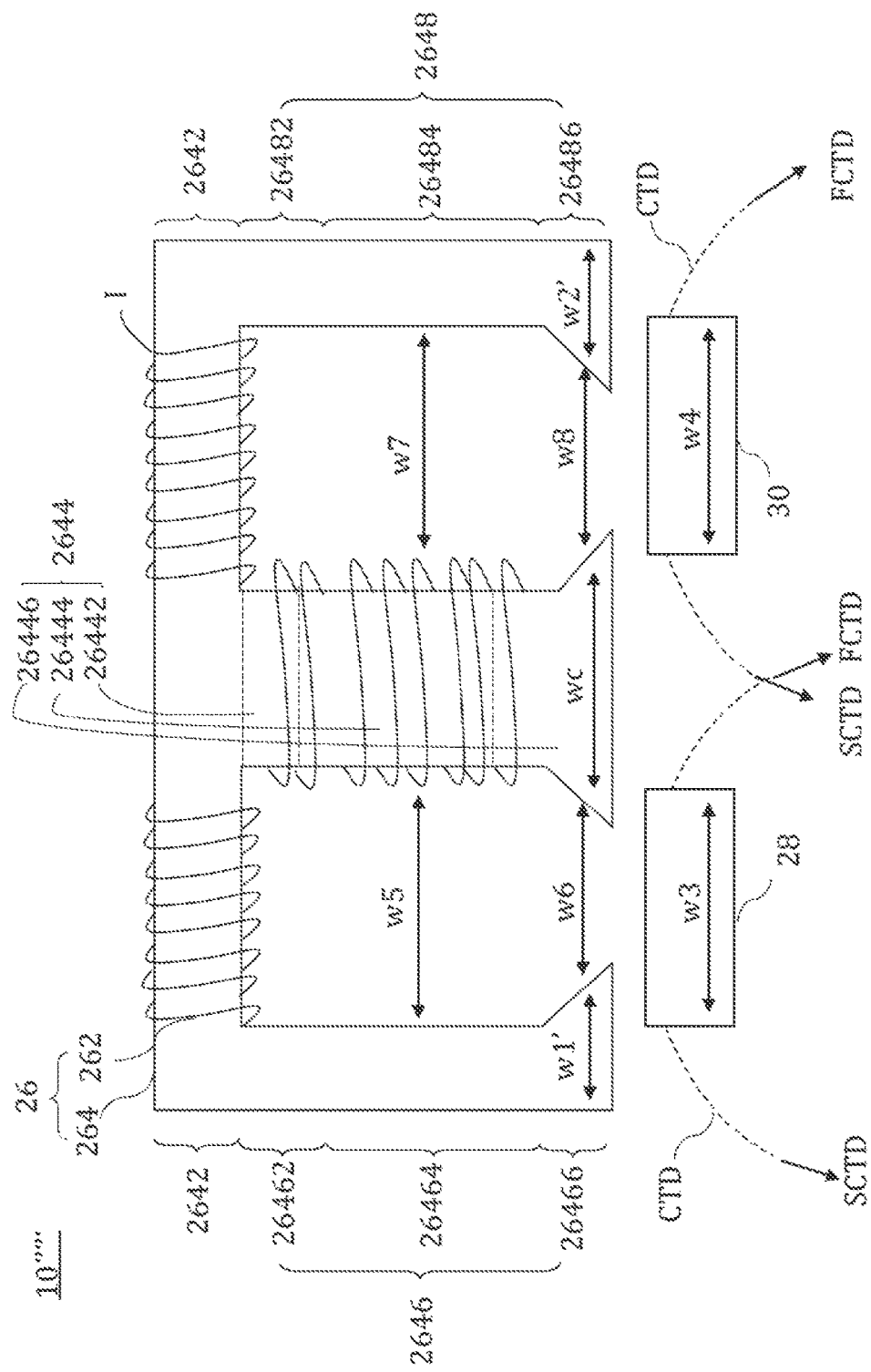
FIG. 9 illustrates the structure of an electromagnetic vibratory pump of the sixth embodiment according to the present disclosure.

FIG. 9 illustrates the structure of an electromagnetic vibratory pump of the sixth embodiment according to the present disclosure, wherein the electromagnetic vibratory pump 10'''' comprises an E-shaped winding 26, a third magnet 28 and a fourth magnet 30.

The E-shaped winding 26 comprises a coil 262 and an electromagnetizable member 264. The E-shaped winding 26 is equivalent to the integration of the first C-shaped winding 12 of the first embodiment and the second C-shaped winding 16 of the third embodiment. Therefore, the coil 262 and the electromagnetizable member 264 serve the same functions as described in the first embodiment and the third embodiment. For brevity, only the differences are described herein, and the same portions are not elaborated in detail.

The coil 262 covers the electromagnetizable member 264; the electromagnetizable member 264, in the presence of an electric current I, forms a fifth magnetic line of force (not shown) and a sixth magnetic line of force (not shown), wherein the fifth magnetic line of force and the sixth magnetic line of force are of different directions. The electromagnetizable member 264 comprises a main body 2642, a central leg 2644, a first side leg 2646 and a second side leg 2648. The central leg 2644 is arranged between the first side leg 2646 and the second side leg 2648. The central leg 2644, the first side leg 2646 and the second side leg 2648 each comprise a first end 26442, 26462, 26482, a magnetizable portion 26444, 26464, 26484 and a second end 26446, 26466, 26486. In this embodiment, the magnetizable portion 26444 of the central leg 2644, the magnetizable portion 26464 of the first side leg 2646 and the magnetizable portion 26484 of the second side leg 2648 are exemplified by a thickness ratio of 2:1:1 for the purpose of illustration. In other embodiments, however, the ratio of thickness can be adjusted according to the need. The second ends 26446, 26466, 26486 may have an end face as a flat plane, a curved plane or other shapes.

The magnetizable portion 26444 of the central leg 2644 and the magnetizable portion 26464 of the first side leg 2646 are apart from each other by a fifth width w5; the second end 26446 of the central leg 2644 and the second end 26466 of the first side leg 2646 are separated by a sixth width w6; the magnetizable portion 26444 of the central leg 2644 and the magnetizable portion 26484 of the second side leg 2648 are apart from each other by a seventh width w7; the second end 26446 of the central leg 2644 and the second end 26486 of the second side leg 2648 are separated by an eighth width w8, wherein the sixth width w6 is less than the fifth width w5, and the eighth width w8 is less than the seventh width w7.

The third magnet 28 and the fourth magnet 30 serve the same functions as the first magnet 14 of the first embodiment. In other words, the third magnet 28 and the fourth magnet 30 are driven by the fifth magnetic line of force to move in the third circular tangential direction, and the third magnet 28 and the fourth magnet 30 are driven by the sixth magnetic line of force to move in the fourth circular tangential direction.

The E-shaped winding 26, the third magnet 28 and the fourth magnet 30 are configured in such a way that their widths satisfy the following formulae:

$$0.5 \times w3 < (\tfrac{1}{2} \times wc + w6) < 1.5 \times w3; \text{ and}$$

$$0.5 \times w4 < (\tfrac{1}{2} \times wc + w8) < 1.5 \times w4;$$

or $$0.5 \times w3 < (w6 + w1') < 1.5 \times w3; \text{ and}$$

$$0.5 \times w4 < (w8 + w2') < 1.5 \times w4; \text{ and}$$

wherein w3 is the width of the third magnet 28, w4 is the width of the fourth magnet 30, wc is the end face width of the second end of the central leg, w6 is the sixth width, w8 is the eighth width, w1' is the end face width of the second end of the first side leg, and w2' is the end face width of the second end of the second side leg.

In another embodiment, the second end 26446 of the central leg 2644 is formed with a notch in the middle of the second end 26446 (not shown), and the notch is designed to serve the same functions as the notch in the second embodiment.

In another embodiment, the electromagnetic vibratory pump 10'''' further comprises at least two gas output units (not shown), and the gas output units are the same as those described in the fifth embodiment.

Figure 8:
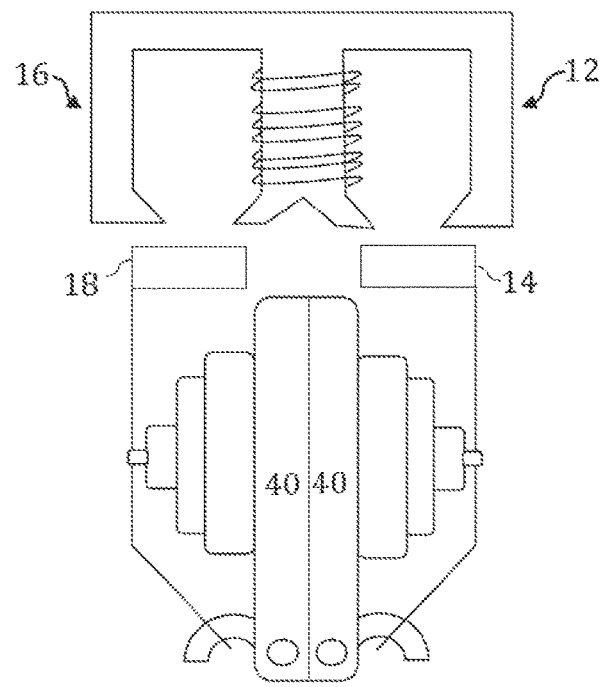
FIGS. 8(*a*) to 8(*c*) illustrates the operation process of the first gas output unit and the second gas output unit of FIG. 7.
Figure 8:
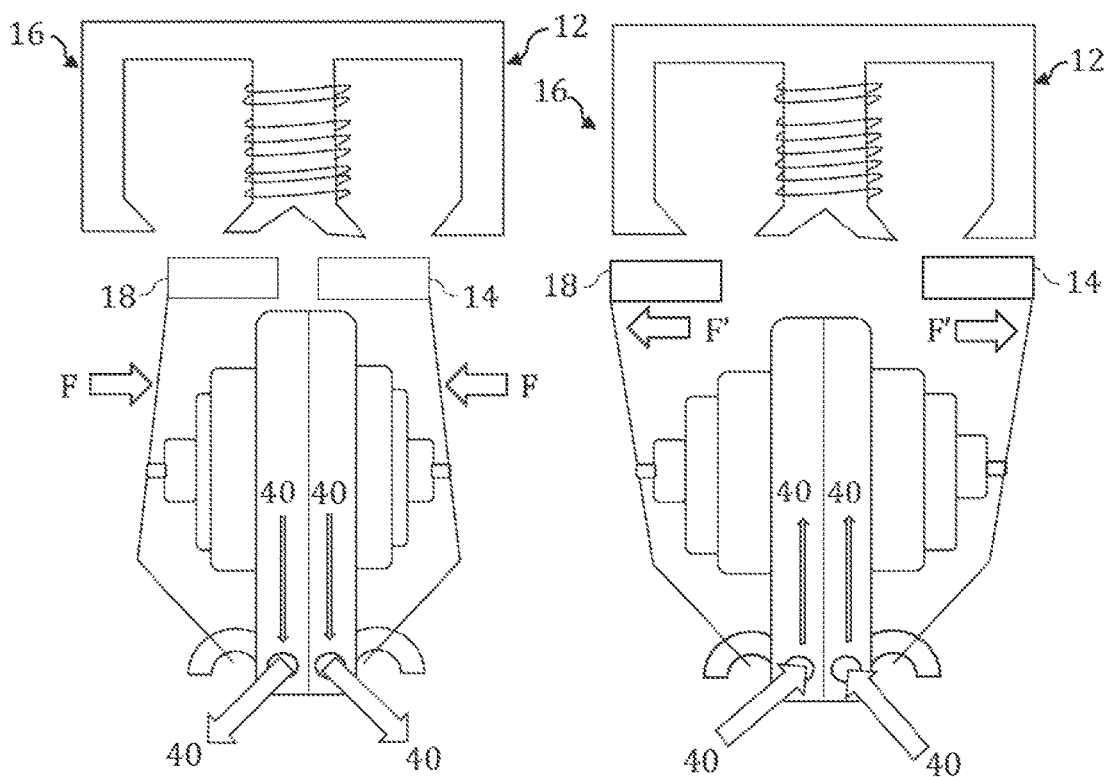
Figure 10:
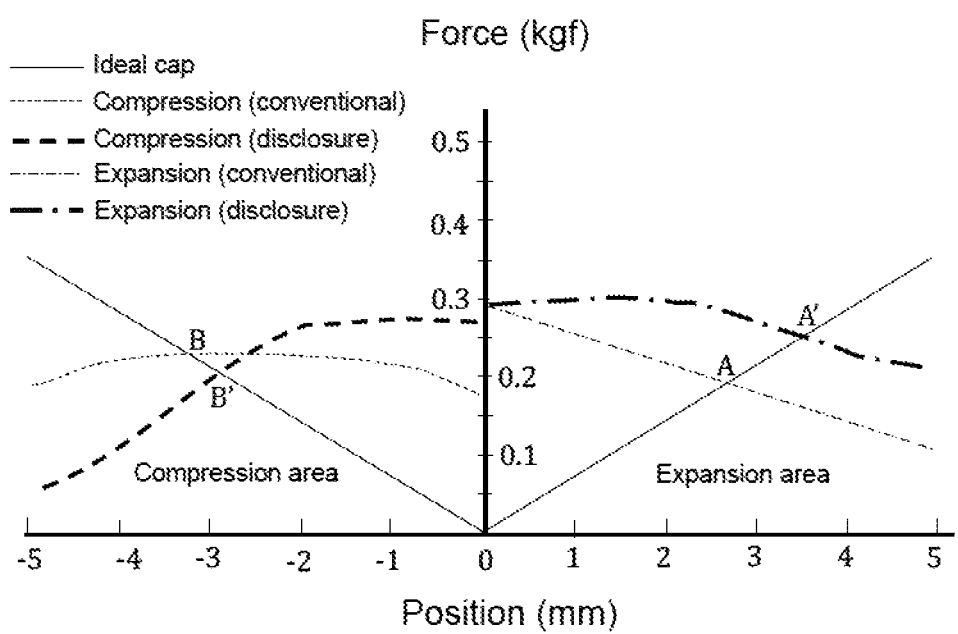
FIG. 10 is a plot illustrating the relationship between position and force of the electromagnetic vibratory pump in FIG. 8.

FIG. 10 is a plot illustrating the relationship between position and force of the electromagnetic vibratory pump in FIG. 8. In FIG. 10, X-axis represents the position graduation in millimeter (mm) and Y-axis represents the force intensity graduation in kilogram force (kgf).

The plot contains five different curves, respectively representing the displacements of the rubber cap resulted by force application. In the plot, relative to the Y-axis, the left area represents the compression of the rubber cap, and the right area represents the expansion of the rubber cap. The five curves are categorized according to the following definitions: (a) an ideal rubber cap, showing the relationship between the displacement of the rubber cap and the force; for example, a 5 mm displacement of the rubber cap requires a 0.4 kgf force, and so forth; (b) conventional arts, showing the force, e.g. magnetic attraction, acting on the rubber cap of a conventional electromagnetic vibratory pump; and (c) the present disclosure, showing the force, e.g. magnetic attraction, acting on the rubber cap of an electromagnetic vibratory pump according to the present disclosure.

In the conventional arts, the force, e.g. magnetic attraction, is generated by the electromagnetic vibratory pump. In the area representing expansion, compared with the ideal rubber cap, the conventional electromagnetic vibratory pump can only expand the rubber cap to about 2.8 mm (intersection point A), much less than 5 mm achieved by the ideal rubber cap; in addition, in the area representing compression, the conventional electromagnetic vibratory pump can only compress the rubber cap to about 3.3 mm (intersection point B).

In the situation according to the present disclosure, the force, e.g. magnetic attraction, is generated by the electromagnetic vibratory pump. In the area representing expansion, compared with the conventional arts, the electromagnetic vibratory pump of the present disclosure can expand further, such that the position of the rubber cap is extended from the intersection point A to the intersection point A', indicating that the rubber cap can be further expanded from the original 2.8 mm to about 3.5 mm; therefore, compared with the conventional arts, the present disclosure can pull the rubber cap farther. Moreover, in the area representing compression, compared with the conventional arts, the electromagnetic vibratory pump of the present disclosure can compress further, such that the position of the rubber cap is improved from the intersection point B to the intersection point B', indicating that the rubber cap can be further compressed from the original 3.3 mm to about 2.9 mm. This improvement can prevent the collision at the central portion of the first magnet 14 and the second magnet 18 in FIG. 8.

Figure 11:
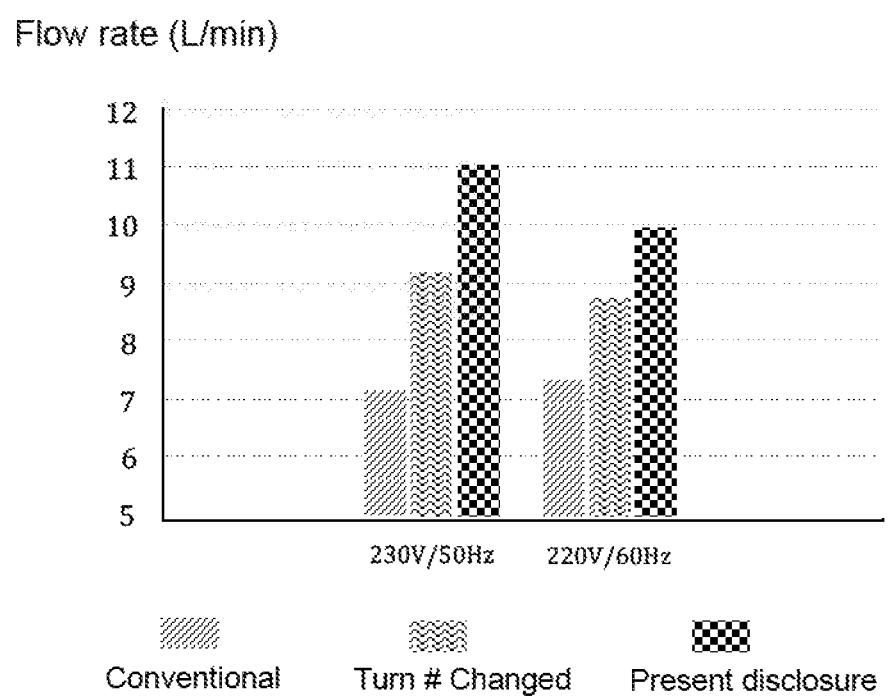
FIG. 11 illustrates a comparison chart for the electromagnetic vibratory pump of the present disclosure and of the conventional arts.

FIG. 11 illustrates a comparison chart showing the performance of the electromagnetic vibratory pump of the present disclosure and of the conventional arts, wherein the X-axis designates different test conditions, i.e. 230V/50 Hz and 220V/60 Hz, and the Y-axis represents the flow rate (liter/minute) of the gas outputted by the rubber cap of the electromagnetic vibratory pump.

In the performance comparison chart, the electromagnetic vibratory pump according to the present disclosure is compared with the electromagnetic vibratory pump of the conventional arts and the electromagnetic vibratory pump with turn number altered. In the 230V/50 Hz example, the electromagnetic vibratory pump according to the present disclosure generates a gas flow rate of 11 liter/min, the electromagnetic vibratory pump of the conventional arts generates a gas flow rate of 7.2 liter/min, and the electromagnetic vibratory pump with turn number altered generates a gas flow rate of 9.2 liter/min, indicating that the present disclosure significantly increases the gas flow rate.

In the 230V/50 Hz example, the electromagnetic vibratory pump according to the present disclosure increases the performance by about 53% and about 20% respectively relative to the electromagnetic vibratory pump of the conventional arts and the electromagnetic vibratory pump with turn number altered. In the 220V/60 Hz example, the electromagnetic vibratory pump according to the present disclosure increases the performance by about 36% and about 10% respectively relative to the electromagnetic vibratory pump of the conventional arts and the electromagnetic vibratory pump with turn number altered.

While preferred exemplary embodiments have been presented in the foregoing detailed description, it should be appreciated that that the exemplary one or more embodiments described herein are not intended to limit the scope, applicability, or configuration of the claimed subject matter in any way. Various changes can be made in the function and arrangement of elements without departing from the scope defined by the claims, which include known equivalents and foreseeable equivalents at the time of filing this patent application.

What is claimed is:

1. An electromagnetic vibratory pump, comprising:
a first C-shaped winding including a first coil and a first electromagnetizable member, the first coil covering the first electromagnetizable member, the first electromagnetizable member including a first main body, a first leg and a second leg, the first leg and the second leg individually including a first end, a second end and a magnetizable portion between the first end and the second end, the first end of the first leg and the first end of the second leg being connected with the first main body, wherein the magnetizable portion of the first leg and the magnetizable portion of the second leg define a first width therebewteen, the second end of the first leg and the second end of the second leg define a second width therebewteen, and the second width is less than the first width; and
a first magnet arranged in proximity to the second end of the first leg and the second end of the second leg, the first magnet swinging in a circular tangential direction, wherein a first minimum distance is defined between a point of tangency of the circular tangential direction and each second end, and the first minimum distance is less than a half of the second width;
wherein the first C-shaped winding, in the presence of electric current, forms a first magnetic line of force and a second magnetic line of force which are of different directions, the first magnet being driven by the first magnetic line of force to move in a first circular tangential direction and the first magnet being driven by the second magnetic line of force to move in a second circular tangential direction; and
wherein the following formula is satisfied:

$$0.5 \times w < (w1+w'') < 1.5 \times w$$

or $$0.5 \times w < (w''+w2) < 1.5 \times w$$

wherein w represents a width of the first magnet, w1 represents an end face width of the second end of the first leg, w" represents the second width, and w2 represents an end face width of the second end of the second leg.

2. The electromagnetic vibratory pump of claim 1, wherein the first electromagnetizable member comprises a plurality of sheets stacked on each other.

3. The electromagnetic vibratory pump of claim 1, wherein the magnetizable portion of the first leg is protruded and extended toward the magnetizable portion of the second leg, or the magnetizable portion of the second leg is protruded and extended toward the magnetizable portion of the first leg; or wherein the second end of the first leg is protruded and extended toward the second end of the second leg, or the second end of the second leg is protruded and extended toward the second end of the first leg.

4. The electromagnetic vibratory pump of claim 3, wherein the second end of the first leg or the second end of the second leg is configured as a parallelogram or a trapezoid.

5. The electromagnetic vibratory pump of claim 1, wherein the second end of the first leg defines a notch with a shape or structure corresponding to distribution of at least one of the first magnetic line of force and the second magnetic line of force.

6. The electromagnetic vibratory pump of claim 1, further comprising a second C-shaped winding and a second magnet,
wherein the second C-shaped winding is connected with the first C-shaped winding to form an E-shaped winding, the second C-shaped winding including a second electromagnetizable member and a second coil, the second coil covering the second electromagnetizable member, the second electromagnetizable member including a second main body, a third leg and a fourth leg, the second main body being connected with the first main body, the fourth leg being combined with the first leg, the third leg and the fourth leg individually including a first end, a magnetizable portion and a second end, the first end of the third leg and the first end of the fourth leg being connected with the second main body, wherein the magnetizable portion of the third leg and the magnetizable portion of the fourth leg define a third width therebewteen, the second end of the third leg and the second end of the fourth leg define a fourth width therebewteen, and the fourth width is less than the third width; and wherein the second magnet is arranged in proximity to the second end of the third leg and the second end of the fourth leg, the second magnet swinging in a circular tangential direction, wherein a second minimum distance is defined between a point of tangency of the circular tangential direction and each second end, and the second minimum distance is less than a half of the fourth width;

wherein the second C-shaped winding, in the presence of electric current, forms a third magnetic line of force and a fourth magnetic line of force which are of different directions, the second magnet being driven by the third magnetic line of force to move in a first circular tangential direction and the second magnet being driven by the fourth magnetic line of force to move in a second circular tangential direction.

7. The electromagnetic vibratory pump of claim 6, wherein the first end has a planar end face, and the second end has a curved end face; and wherein the second end of the fourth leg and the second end of the first leg define a notch with a shape or structure corresponding to distribution of at least one of the first magnetic line of force, the second magnetic line of force, the third magnetic line of force, and the fourth magnetic line of force.

8. The electromagnetic vibratory pump of claim 7, wherein the notch does not influence, interfere or damage smoothness of at least one of the first magnetic line of force, the second magnetic line of force, the third magnetic line of force and the fourth magnetic line of force.

9. The electromagnetic vibratory pump of claim 6, wherein the first magnet and the second magnet move in opposite directions.

10. The electromagnetic vibratory pump of claim 1, further comprising a first gas output unit connected with the first magnet driven by the first C-shaped winding to swing reciprocatingly in the first circular tangential direction and the second circular tangential direction to enable the first gas output unit to output gas.

11. The electromagnetic vibratory pump of claim 10, wherein the first gas output unit comprises a vibration bar, a rubber cap and a gas chamber, the vibration bar including two terminals and a bar body formed therebetween, one terminal of the vibration bar being connected with the first magnet, the other terminal of the vibration bar being fixed to the gas chamber, the rubber cap being arranged between the bar body and the gas chamber.

12. The electromagnetic vibratory pump of claim 6, further comprising a first gas output unit and a second gas output unit respectively connected with the first magnet and the second magnet, the first C-shaped winding driving the first magnet and the second C-shaped winding driving the second magnet, such that the first magnet and the second magnet reciprocate in the first circular tangential direction and the second circular tangential direction to enable the first gas output unit and the second gas output unit to output gas respectively.

13. The electromagnetic vibratory pump of claim 12, wherein the first gas output unit and the second gas output unit individually comprise a vibration bar, a rubber cap and a gas chamber, the vibration bar including two terminals and a bar body formed therebetween, one terminal of the vibration bar being connected with the first magnet or the second magnet, the other terminal of the vibration bar being fixed to the gas chamber, the rubber cap being arranged between the bar body and the gas chamber.

14. An electromagnetic vibratory pump, comprising:

an E-shaped winding, including a coil and an electromagnetizable member, the coil covering the electromagnetizable member, the electromagnetizable member including a main body, a central leg, a first side leg and a second side leg, the central leg being arranged between the first side leg and the second side leg, the central leg, the first side leg and the second side leg individually including a first end, a second end and a magnetizable portion between the first end and the second end, the first end being connected with the main body, wherein the magnetizable portion of the central leg and the magnetizable portion of the first side leg define a fifth width, the second end of the central leg and the second end of the first side leg define a sixth width, the magnetizable portion of the central leg and the magnetizable portion of the second side leg define a seventh width, and the second end of the central leg and the second end of the second side leg define an eighth width, the sixth width being less than the fifth width, and the eighth width being less than the seventh width;

a third magnet arranged in proximity to the second end of the first side leg and the second end of the central leg, the third magnet swinging in a circular tangential direction, wherein a third minimum distance is defined between a point of tangency of the circular tangential direction and each second end, and the third minimum distance is less than a half of the seventh width; and a fourth magnet arranged in proximity to the second end of the second side leg and the second end of the central leg, the fourth magnet swinging in a circular tangential direction, wherein a fourth minimum distance is defined between a point of tangency of the circular tangential direction and each second end, and the fourth minimum distance is less than a half of the eighth width;

wherein the E-shaped winding, in the presence of electric current, forms a fifth magnetic line of force and a sixth magnetic line of force which are of different directions, the third magnet and the fourth magnet being driven by the fifth magnetic line of force to move in a third circular tangential direction and the third magnet and the fourth magnet being driven by the sixth magnetic line of force to move in a fourth circular tangential direction; and wherein the following formulae are satisfied:

$$0.5 \times w3 < (\tfrac{1}{2} \times wc + w6) < 1.5 \times w3; \text{ and}$$

$$0.5 \times w4 < (\tfrac{1}{2} \times wc + w8) < 1.5 \times w4;$$

or $$0.5 \times w3 < (w6 + w1') < 1.5 \times w3; \text{ and}$$

$$0.5 \times w4 < (w8 + w2') < 1.5 \times w4;$$

wherein w3 represents a width of the third magnet, w4 represents a width of the fourth magnet, wc represents an end face width of the second end of the central leg, w6 represents the sixth width, w8 represents the eighth width, w1' represents an end face width of the second end of the first side leg, and w2' represents an end face width of the second end of the second side leg.

15. The electromagnetic vibratory pump of claim 14, wherein a ratio of thickness of the magnetizable portion of the central leg, the magnetizable portion of the first side leg, and the magnetizable portion of the second side leg is 2:1:1.

16. The electromagnetic vibratory pump of claim 14, wherein the first end has a planar end face, and the second end has a curved end face.

17. The electromagnetic vibratory pump of claim 14, wherein the second end of the central leg defines a notch with a shape or structure corresponding to distribution of at least one of the fifth magnetic line of force and the sixth magnetic line of force.

18. The electromagnetic vibratory pump of claim 17, wherein the notch does not influence, interfere or damage smoothness of at least one of the fifth magnetic line of force and the sixth magnetic line of force.

19. The electromagnetic vibratory pump of claim 14, further comprising a third gas output unit and a fourth gas output unit respectively connected with the third magnet and the fourth magnet, the E-shaped winding driving the third magnet and the fourth magnet, such that the third magnet and the fourth magnet respectively reciprocate in the third circular tangential direction and the fourth circular tangential direction to enable the third gas output unit and the fourth gas output unit to output gas respectively.

20. The electromagnetic vibratory pump of claim 19, wherein the third gas output unit and the fourth gas output unit individually comprise a vibration bar, a rubber cap and a gas chamber, the vibration bar including two terminals and a bar body formed therebetween, one terminal of the vibration bar being connected with the third magnet or the fourth magnet, the other terminal of the vibration bar being fixed to the gas chamber, the rubber cap being arranged between the bar body and the gas chamber.

\* \* \* \* \*